United States Patent

[11] 3,570,347

[72] Inventor Anton Josef Blaser
1639 Posilipo Lane Montecito, Santa Barbara, Calif. 93103

[21] Appl. No. 766,911
[22] Filed Oct. 11, 1968
[45] Patented Mar. 16, 1971

[54] PORTABLE CARD PUNCHING DEVICE
7 Claims, 7 Drawing Figs.

[52] U.S. Cl. .......... 83/278, 35/48, 83/588, 83/691
[51] Int. Cl. .......... B26d 5/22
[50] Field of Search .......... 83/225, 226, 227, 213, 276, 278, 588, 691; 35/48, 9; 234/128

[56] References Cited

UNITED STATES PATENTS

| | | | |
|---|---|---|---|
| 682,197 | 1901 | Hollerith | 83/225 |
| 1,346,089 | 1920 | Hasselstrom | 83/229X |
| 3,224,111 | 1965 | Muelberger, Jr. | 35/9X |

*Primary Examiner*—Andrew R. Juhasz
*Assistant Examiner*—James F. Coan
*Attorney*—Elliott & Pastoriza

ABSTRACT: A portable card punching device for use by students in recording their answers to tests and in similar situations so that the resulting punched card can be processed by computers comprises a frame structure defining a card receiving channel. A plurality of pushrods are provided in a row running across and above the channel such that depression of any one rod will punch a hole in a card received in the channel in a certain position along a row of points on the card corresponding to the position of the pushrod. A mechanical indexing means is provided in the frame structure and interconnected with the pushrods such that upon depression of any one rod, the card will be moved forward an incremental distance in the channel and properly indexed to a next successive row so that only one punch will appear in any one row on the card. The entire device is mechanically operated requiring no electrical connections and is sufficiently portable as to be easily carried around by a person and used as desired.

Patented March 16, 1971 3,570,347

2 Sheets-Sheet 1

INVENTOR:
ANTON JOSEF BLASER
BY
Elliott & Pastoriza
ATTORNEYS

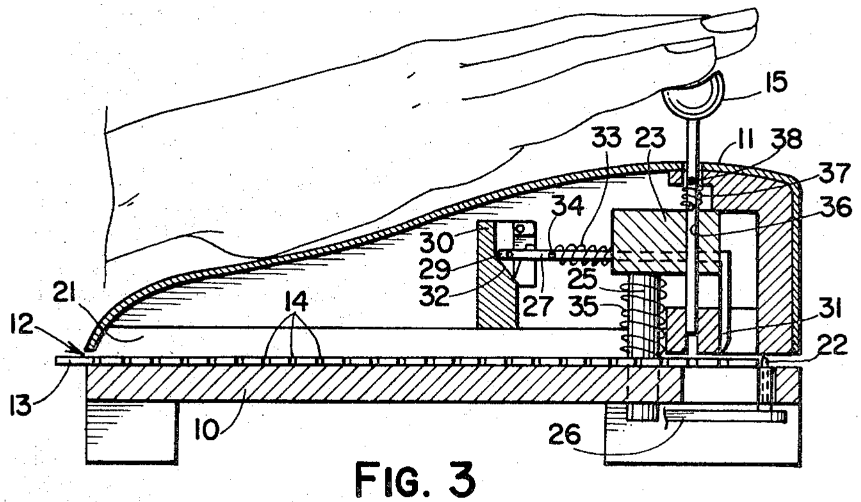
FIG. 3
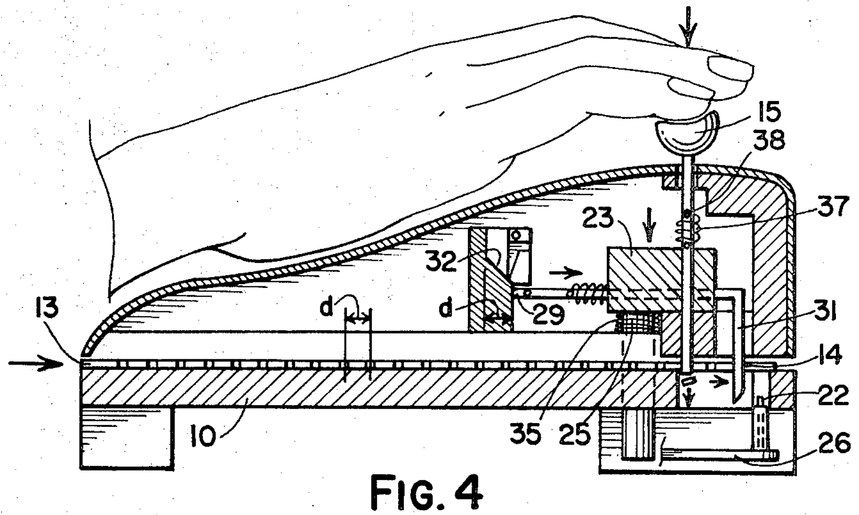
FIG. 4
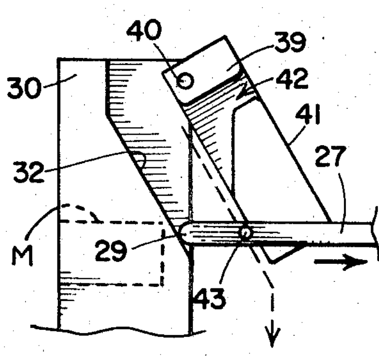
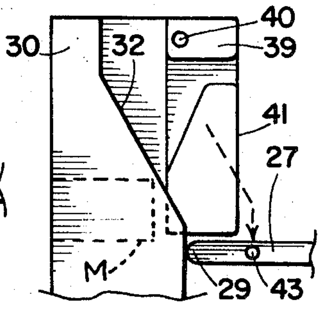
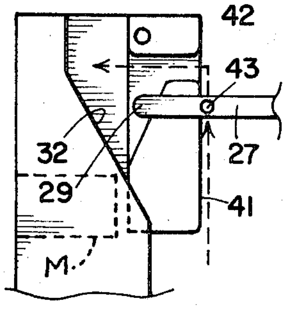
FIG. 5 FIG. 6 FIG. 7
INVENTOR:
ANTON JOSEF BLASER
BY
Elliott & Pastoriza
ATTORNEYS

PORTABLE CARD PUNCHING DEVICE

This invention relates broadly to computer equipment and more particularly to a novel portable card punching device for punching holes in cards used in punched card computer apparatus.

BACKGROUND OF THE INVENTION

It is now common practice to correct test results by computers wherein the tests involved are those of the multiple choice type so that a student or other person being tested need merely indicate a particular point on a sheet corresponding to his desired answer. The sheet itself may take the form of special paper for use with a special stylus or ink marking device. Alternatively, cards may be provided and a point on the card punched by a suitable stylus.

The resulting sheet or card may then be processed electrically or mechanically by suitable computers so that the same can be graded.

In systems of the foregoing type to date, there has normally been required a special pen or stylus manually held by the person taking the test and it is incumbent upon him to select the desired point on the sheet or card corresponding to his proposed answer and effect the proper marking or punch as the case may be. This process is not only time consuming but in addition, imperfect marks or punches may be made resulting in jamming of the subsequently used computer equipment. In addition, certain other problems arise with present systems. For example, if a large number of students are taking a test, the cards are exposed and it is not difficult for one student to glance at another student's card and observe where a mark or punch was made. In other instances, the student himself may incorrectly mark or punch a card and wish to change the mark or punch and thus effect a second mark or punch on the same line or group of points corresponding to multiple answers to a given question. Moreover, a student may inadvertently skip a question or possibly effect a mark or punch in a group of multiple answers not corresponding to the particular question involved.

BRIEF DESCRIPTION OF THE PRESENT INVENTION

With the foregoing in mind, the present invention contemplates the provision of a mechanical portable card marking or punching device in which the heretofore described problems are substantially overcome.

More particularly, the invention contemplates the provision of a frame structure defining a card receiving channel. In the preferred embodiment, the card receiving channel is dimensioned to accommodate computer cards such as manufactured by the International Business Machines Corporation wherein there are defined a plurality of rows of points on the card at which punches may be effected. A plurality of pushrods are provided on the frame structure in a row running transverse to and above the channel receiving the card so that depression of any one rod will effect a desired punching of a corresponding point in one of the card rows. The frame structure is provided with a cover over the channel, the pushrods extending outwardly through the top of the cover so that the card portion being punches is not visible.

The device also incorporates a mechanical indexing means responsive to depressing of any one of the rods to advance the card an incremental distance corresponding to the distance between successive rows so that at the time any one rod is depressed, the card is advanced. As a consequence, only one punch can be effected in any one row.

With the foregoing arrangement, a student take taking a multiple choice written or even an oral test need simply insert one of the IBM cards in the channel. For the first question, the student will press one of the several rods corresponding to one of the several multiple choices. This action will result in advancing the card to a specific row and a punching of one of the points in the row corresponding to the particular pushrod depressed. The next question will be answered by pressing another pushrod corresponding to the student's choice which action will again first advance the card an incremental distance to position the next row beneath the rods and then effect a punching of a desired point in the row corresponding to the position of the second pushrod.

The foregoing is repeated until the card, which may accommodate, for example, forty rows of multiple choice points to be punched, is completed, at which time the card is removed and may immediately be processed in a punched card computer.

The computer itself may be programmed to both correct and grade the tests and up to 600 cards per minute may be processed depending on the type of computer used.

The portable card punching device itself is light, easy to use, completely portable and compact and self-contained. There is no necessity for motors or electrical devices. Further, manual mistakes or ambiguities are eliminated since a properly indexed mechanical punching takes place in response to manual operation of the pushrods involved. In this respect, the card indexing means assures proper advancement of the card to a successive row upon depressing of a rod so that the marks or punches in the card itself are always properly positioned for accurate grading by the computer.

BRIEF DESCRIPTION OF THE DRAWINGS

A better understanding of the invention will be had by now referring to a preferred embodiment thereof as illustrated in the accompanying drawings, in which:

FIG. 3 is a side cross section taken in the direction of the arrows 3–3 of FIG. 2 showing the device with the cover in place and with the elements in initial positions preparatory to punching a card;

FIG. 4 is a view similar to FIG. 3 but illustrating the relative positions of certain elements after a punching operation has been completed: and, FIGS. 5, 6, and 7 schematically illustrate successive positions of certain ones of the elements during a punching operation in the device of FIGS. 3 and 4.

Figure 1:
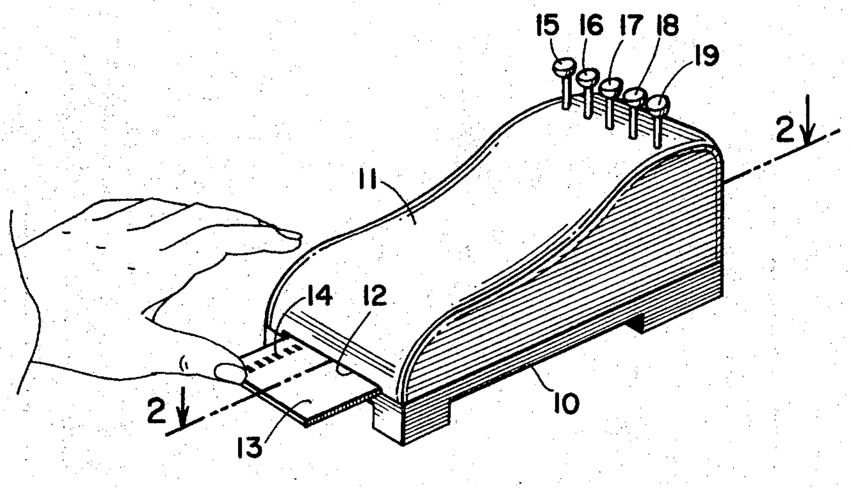
FIG. 1 is a perspective view of a portable card punching device designed in accordance with the present invention.

Referring first to FIG. 1 there is shown a frame 10 including a cover 11 and defining a card receiving channel 12 having an opening slot at one end as indicated in FIG. 1 for receiving a processing card 13. Card 13 preferably includes a column of evenly spaced indexing perforations 14 along one longitudinal edge. The purpose for these perforations will become clearer as the description proceeds.

Extending transversely across the upper portion of the cover 11 is a plurality of pushrods 15, 16, 17, 18, and 19. The arrangement is such that upon depression of one of the pushrods, a marking or punch will be made in the card 13 at a corresponding cross position on a row of points on the card.

Figure 2:
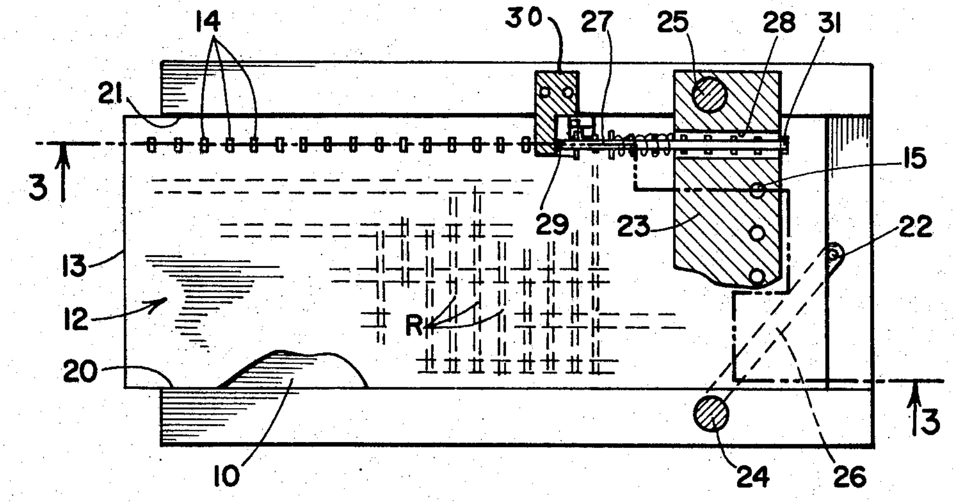
FIG. 2 is a plan view of the device of FIG. 1 with the cover removed showing certain portions in fragmentary cross-sectional form looking generally in the direction of the arrows 2–2 of FIG. 1.

Referring now to FIG. 2, it will be noted that the frame 10 defines a flat guide surface having spaced, parallel, raised sidewalls 20 and 21 to define the card receiving channel 12. Within the frame there is provided a card stop means 22 shown at the right-hand central portion of the flat surface of the frame. When the card 13 is inserted in the channel, it will thus assume a consistent initial position determined by abutment of the right-hand of the card against the card stop means 22.

The frame structure also includes a crossbar 23 extending above and across the channel 12. First and second vertical mounting plungers 24 and 25 support the crossbar for vertical movement relative to the frame between upper and lower positions. These plungers are guided for such vertical movement within suitable bores in the raised wall portions 20 and 21. The plunger 24 is intercoupled with the card stop means 22 as indicated by the dotted lines 26 beneath the frame such that lowering of the crossbar 23 will lower the card stop means 22 to free the card for advancing movement; that is, movement from left to right as viewed in FIG. 2.

The crossbar 23 serves to support and guide the pushrods such as the rod 15 shown in FIG. 2, the rods themselves passing through suitable vertical bores in the crossbar.

A card-indexing means is provided on the frame for automatically advancing the card 13 in response to movement of the crossbar 23 from its upper to lower position. This card-indexing means includes a pawl shaft 27 passing through a horizontal bore 28 in the crossbar 23 running in a direction generally parallel to one longitudinal edge of the card 13. One end of the pawl shaft 27 terminates in a cam follower end 29 engaging a sloping cam surface formed on a cam block 30 secured to the raised wall 21 of the frame. The other end of the pawl shaft terminates in a downwardly directed pawl 31 arranged to be received in successive ones of the various longitudinal perforations 14. The perforations 14 are spaced along the card to define the initial positions of the various cross rows of points on the card corresponding to the number of pushrods used in the device. These rows are schematically indicated by the dashed lines R in FIG. 2.

FIG. 3 illustrates further details of the device. Thus, the sloping cam surface for the cam block 30 is shown at 32 in FIG. 3 in camming engagement with the cam follower end 29 of the pawl shaft 27. This cam follower end 29 is normally biased into camming engagement with the sloping cam surface 32 as by a biasing spring 33 coupled between a cross pin 34 in the shaft 27 and the periphery of the entrance portion of the horizontal bore in the crossbar 23. The downwardly directed pawl 31 at the right-hand end of the pawl shaft 27 is shown positioned at a level above the surface of the card 13 received in the channel defined by the frame 10. The pawl 31 assumes this position when the crossbar 23 is in its uppermost position as illustrated in FIG. 3.

It will also be noted in FIG. 3 that the card stop means 22 projects upwardly such that the right-hand edge of the card will engage the structure and thus index the initial position of the card. The interconnecting link to the first plunger structure described in FIG. 2 is illustrated again at 26.

The second plunger guide for the cross bar 23 described at 25 in FIG. 2 is illustrated in full view in FIG. 3 and it will be noted that a compression spring 35 is provided normally biasing the crossbar 23 to its uppermost position. A similar compression spring would be provided on the first plunger 24 described in FIG. 2.

Vertical bores in the crossbar 23 receive the pushrods as described. One such bore is illustrated at 36 for the pushrod 15. A biasing spring 37 surrounds a protruding portion of the pushrod and is disposed between a cross pin 38 and the upper periphery of the bore 36 in the crossbar 23. The biasing spring 37 functions to hold the pushrod in an elevated position relative to the crossbar 23 such that the lower end of the pushrod is disposed in a position above the card 13.

The manner in which a desired punch can be effected in the card will now be evident by referring to FIG. 4 wherein, by way of example, the pushrod 15 has been depressed. Thus, the biasing spring 37 is sufficiently stiff that initial depression of the pushrod 15 merely serves to more the crossbar 23 from its upper to lower position through the medium of the biasing spring itself. This downward movement of the crossbar 23 results in the pawl 31 immediately being received in one of the perforations 14 of the card and simultaneously, lowering of the card stop means 22. Further downward movement of the crossbar 23 then results in a horizontal movement of the pawl shaft as a consequence of the cam follower end 29 riding down on the sloping cam surface 32. The horizontal extent of the surface 32 is indicated by the letter *d* and corresponds to the distance between successive perforations 14 also indicated by the letter *d*. Thus, the extent of horizontal movement of the pawl shaft as a result of the camming action is such as to advance the card 13 an incremental distance corresponding to the distance *d*.

After this advancement of the card, further depression of the pushrod 15 will compress the spring 37 with the result that the lower end of the rod extending from the crossbar 23 will punch a hole in the card 13 at one of the points along the cross row corresponding to the particular position of the button depressed.

When the rod is manually released, the springs 37 and 34 will return the pushrod and crossbar 23 to their initial positions. During this latter motion, it is important that the pawl shaft not move horizontally until the downwardly directed pawl 31 is free of the perforation 14; that is, not until the crossbar 23 is in its uppermost position. To realize this objective, the cam block includes a return guide element for constraining the pawl shaft to vertically upward movement only during the return of the crossbar 23 from its lower to upper position. The operation of this return guide element on the cam block 32 will best be understood by now referring to FIGS. 5, 6, and 7.

Referring first to FIG. 5, the return guide element is shown at 39 pivoted to the cam block 30 as at 40 for outward swinging movement. An outer edge portion of the element 39 defines a vertical return guide surface 41 terminating at an upper end to define a slot opening or channel 42. A cross pin 43 in the pawl shaft 27 serves as a cam follower for engagement with the surface 41 when the crossbar 23 described in FIGS. 3 and 4 returns from its lower to its upper position.

Thus with particular reference to the relative positions of the elements in FIG. 5, the position of the cam follower end 29 on the sloping cam surface 32 corresponds to an intermediate position of the crossbar 23 when moving from its upper to its lower position. It will be noted that the portion of the pin 43 projecting into the plane of the drawing has engaged the guide element 39 to cause the same to swing outwardly about the pivot 40.

When the pawl shaft reaches its lowermost position as illustrated in FIG. 6, the pin 43 is below the lower end of the guide element 39 so that the same swings by gravity back to a vertical position as shown. To insure swinging back of the element completely to its initial vertical position, a magnet may be provided as indicated at M. When the crossbar now moves vertically upwardly, the pin 43 will engage the return guide vertical surface 41 of the guide element 39 and thus be constrained to vertical movement.

When the crossbar 23 reaches its uppermost position, the pin will then pass over the top of the vertical guide surface 41 into the channel 42 so that the cam follower end 29 is again in a position to engage the sloping cam surface 32.

OPERATION

The operation of the invention will be evident from the foregoing description.

Assume, for the sake of illustration, that several students are to take a test in which multiple choice answers are provided. In the particular device described, there are illustrated five pushrods so that if five multiple choices are available for the answer to a given test question, any one answer can be selected. If each of the questions only has three or four multiple choices, only the first three or four pushrods would be used accordingly. If desired, the device may be manufactured with more than five pushrods in the event that it would be used for a more comprehensive test in which a greater number than five multiple choice answers is provided.

The first row of cross points on the card starts with the second longitudinal perforation 14 from the right-hand end of the card as viewed in the drawings. The successive multiple choice answers are represented respectively by the successive rows in the card.

The student will thus initially insert the card 13 in the channel 12 until the right-hand end of the card abuts against the card stop means 22. The student will then examine the first question of the test or listen to the first question if the test is orally given. He will then select one of the multiple answers and depress a corresponding pushrod. This action, as described heretofore, will initially result in a lowering of the crossbar 23 thereby causing the card-indexing means in the form of the pawl shaft to advance the card an incremental distance corresponding to the distance *d* thereby positioning the first row of points on the card under the various pushbutton shafts. Further depression of the pushbutton rod 15 will then punch out a portion of the card in a desired position along the row corresponding to the physical position of the pushrod.

When the pushrod is released, the pushrod and the crossbar 23 will be returned to their initial elevated and upper positions respectively by the springs 37 and 35. It should also be noted at this point that the card stop means 22 will also tend to return to its uppermost position as a consequence of its coupling to the first plunger through the link 26. However, the card stop means is designed in the form of a projecting telescoping pin which is biased upwardly but is capable of retracting into the structure as indicated by the dashed lines in FIGS. 3 and 4. As a consequence, the uppermost portion of the stop pin will simply engage the under surface of the card which has now been advanced over the pin so that the pin itself will be held telescoped within the structure and the card, once it has been advanced a first increment, is free to pass to the right along the channel.

When the next question is to be answered, the operation will be repeated, the student selecting the appropriate pushrod. Again the card will be advanced to thereby position the next successive row of points on the card beneath the pushrod so that a desired punch can be effected.

After the test has been completed, the student simply removes the card and the same may readily be processed extremely rapidly in conventional punched card computer equipment.

Since the advancement of the card to successive rows is automatically effected upon operation of any one of the pushrods, it will be evident that only one punch on any one row can result, assuming, of course, that the student does not press two rods simultaneously. Further, the lower ends of the pushrods can be properly designed to effect the desired geometrical punch uniformly in the card. This fact coupled with the mechanical indexing as described assures that the marks are clear and unambiguous.

Finally, the provision of the cover 11 avoids the possibility of adjacent students observing the location of a punch in the card during the actual punching operation so that cheating is inhibited.

From the foregoing description, it will accordingly be evident that the present invention has provided a unique and novel portable card punching device wherein all of the various advantages described are fully realized.

I claim:

1. A portable card punching device comprising, in combination:

a. a frame including a flat guide surface having spaced, parallel, raised sidewalls to define a card receiving channel;
b. a crossbar extending above and across said channel;
c. first and second vertical mounting plungers received in said frame and supporting said crossbar for vertical movement relative to said frame between upper and lower positions;
d. a plurality of pushrods extending vertically through said crossbar in positions along said crossbar to enable punching desired selected points defining a cross row on a card received in said channel;
e. a card stop means in said frame coupled to a first one of said vertical mounting plungers and defining a stop for limiting the initial degree of insertion of said card into said channel when said crossbar is in its upper position;
f. card-indexing means coupled to said crossbar for moving said card an incremental distance along said channel corresponding to the spacing between adjacent cross rows of points on said card, said card indexing means including:
   1. a cam block secured to one of said raised sidewalls having a sloping cam surface;
   2. a pawl shaft horizontally positioned parallel to said channel, said crossbar having an horizontal bore receiving said pawl shaft, one end of said pawl shaft defining a cam follower engaging said sloping cam surface and the other end terminating in a downwardly directed pawl positioned to be received in one of a column of evenly spaced perforations along a longitudinal edge of said card defining the initial points of said cross rows; and
   3. biasing means urging said pawl shaft cam follower end against said sloping cam surface, the vertical height of said surface and its horizontal extent being such that movement of said crossbar from its upper to its lower vertical position results in downward movement of said pawl into one of said perforations and horizontal movement of said pawl shaft relative to said horizontal bore to thereby move said card said incremental distance; and
g. pushbutton rod means coupling said pushbutton to said crossbar such that depression of any one of said pushrods initially moving said crossbar from its upper to lower position to index said card to a successive rod and thereafter further depression of the pushrod urging the pushrod through said crossbar so that the lower end of the rod punches a hole in said card at a given cross position on said row corresponding to the position of the particular one of said pushrods that is depressed.

2. A portable card-punching device comprising, in combination:

a. a frame defining a card receiving channel;
b. a crossbar vertically movably mounted on said frame;
c. a plurality of pushrods in a row running transverse to said channel, said pushrods being guided for vertical movement by said crossbar in positions above said channel;
d. indexing means mounted on said frame and responsive to an initial downward movement of any one of said pushrods to move said card along said channel an incremental distance, further downward movement of the pushrod effecting an indication on said card, said indexing means including a cam block secured to said frame having a sloping cam surface; and a pawl means coupled to said crossbar and constrained to horizontal movement relative to said crossbar, one end of said pawl means terminating in a cam follower end engaging said sloping cam surface and the other end in a pawl positioned to engage said card and effect said incremental movement upon downward movement of said crossbar upon initial downward movement of a pushrod.

3. A device according to claim 2, including a card stop means in said frame means coupled to said crossbar and responsive to downward movement of said crossbar to free said card for incremental movement by said indexing means.

4. A device according to claim 1, in which said cam block includes a return guide element pivoted to an upper portion of said block adjacent to one side of said sloping cam surface for outward swinging movement from a vertical hanging position, said pawl shaft having a cross pin engaging said element to swing the same outwardly as said cam follower end moves along said cam surface, said pin moving free of said element after reaching the lower end of said cam surface so that said element swings back to its vertical hanging position, a portion of said element defining a vertical return guide surface engaged by said pin to hold said pawl shaft in its moved horizontal position while said crossbar moves from its lower to upper position, said pin passing over the upper end of said return guide surface to permit said cam follower end to engage said sloping cam surface after said crossbar has reached its upper position whereby said indexing means is in position for a subsequent indexing of said card when a pushbutton is again depressed.

5. A device according to claim 1, in which said pushbutton rod means includes a biasing spring holding said rod in a given elevated position in said crossbar such that initial downward movement of said rod lowers said bar through the medium of said spring and further movement of said rod compresses said spring so that the end of said rod can move further downwardly to punch said card.

6. A device according to claim 1, including a cover on said frame through which the upper portions of said pushrods extend whereby the portion of said card being punched is not visible.

7. A device according to claim 4, in which said cam block includes a magnet positioned to exert a magnetic pull on said element to positively return said element to said vertical hanging position.